United States Patent

[11] 3,590,297

| [72] | Inventors | Earl F. Smith<br>Lombard;<br>Anthony Jacyno, Aurora, both of, Ill. |
|---|---|---|
| [21] | Appl. No. | 866,851 |
| [22] | Filed | Oct. 16, 1969 |
| [45] | Patented | June 29, 1971 |
| [73] | Assignee | G. W. Murphy Industries, Inc. |

[54] MOTOR BRUSH WIRE MOUNTING MEMBERS
14 Claims, 7 Drawing Figs.

[52] U.S. Cl.................................................. 310/239, 310/249
[51] Int. Cl................................................ H02k 13/00
[50] Field of Search.............................. 310/249, 245, 247, 242, 248, 239

[56] References Cited
UNITED STATES PATENTS

| 3,127,533 | 3/1964 | Gardner, Jr. | 310/239 |
| 3,176,177 | 4/1965 | Huston | 310/247 |
| 3,182,218 | 5/1965 | Videtic | 310/247 |
| 3,226,585 | 12/1965 | Roe | 310/239 |

Primary Examiner—Milton O. Hirshfield
Assistant Examiner—R. Skudy
Attorney—Hofgren, Wegren, Allen, Stellman & McCord ABSTRACT: Clips are provided for holding brush lead wires and for anchoring the brush mounting members during assembly of an electric motor driven portable device to prevent pinching of the lead wires between the casing members. Each clip member includes a snap-receiving cavity for receiving and holding the wire near the end connected to the brush. The wire extending from the snap-receiving cavity through a slot in the clip member to contact the brush is parallel to the sliding axis of the brush. A spring urges the end of the wire against the rear of the brush and urges the brush against the armature commutator of the motor and the slot permits the wire to follow the sliding movement of the brush. The terminal end of the wire is received around a projection on the rear of the brush which also receives the spring.

PATENTED JUN29 1971

INVENTORS
Earl J. Smith
Anthony Jacyno

BY Hofgren, Wegner, Allen, Stellman & McCord
ATTORNEYS

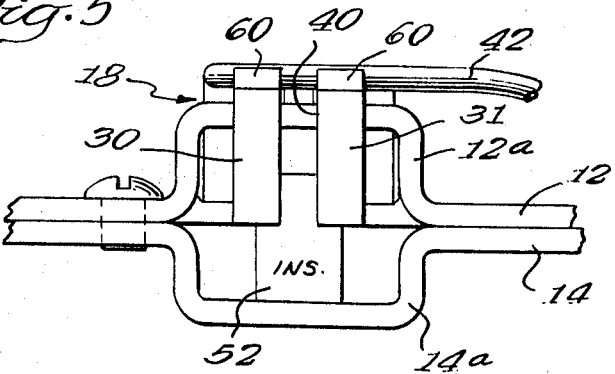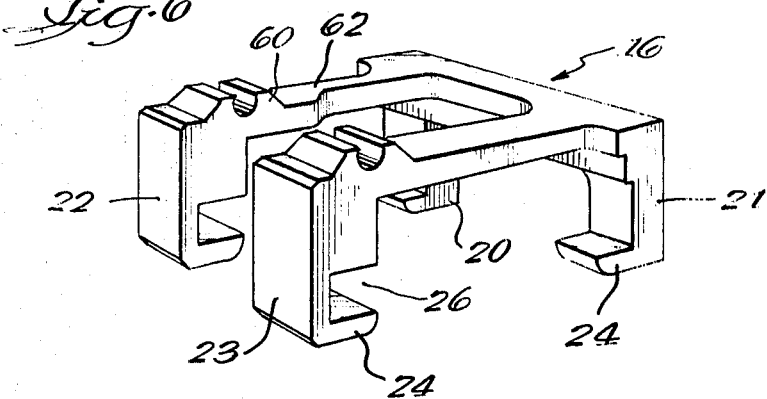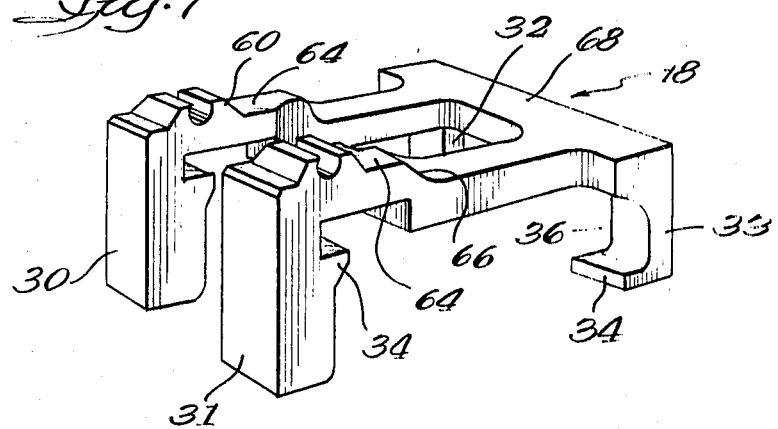

MOTOR BRUSH WIRE MOUNTING MEMBERS

BACKGROUND OF THE INVENTION

1. Field of the Invention

This invention relates to means for mounting lead wires for motor brushes and more particularly relates to means for mounting both the lead wire and the brush holder in an electric motor driven portable device.

2. Brief Description of the Prior Art

It is known to mount an electric motor on a mounting plate or other mounting system, e.g., as described by A. Jacyno in U.S. Pat. application, Ser. No. 850,834, entitled SHEET METAL FRAME MODULE, filed Aug. 18, 1969, prior to assembling the motor mounting plate with a casing in a portable electric device. However, during assembly of the motor mounting with a casing, there is danger that the lead wires to the motor brushes may be pinched between portions of the casing or even become dislocated and damaged during operation of the tool after assembly.

SUMMARY OF THE INVENTION

This invention is an improvement in devices driven by electric motors, and especially in portable devices, such as drills, lawn edgers, lawn trimmers, etc. The present invention is especially useful with those devices in which the motor is mounted on a motor mounting plate or an assembly of motor mounting plates, although it can also be used in devices in which the motor mounting member is a casting or molding. The invention provides a clip member for receiving and holding the motor brush lead wire in a position adjacent the terminal end which electrically contacts the motor brush. The motor brush is normally mounted for slidable movement toward and against the armature commutator and is urged against the commutator by a spring or like biasing means. The clip includes an insulating plate having two opposing ends with a system at each end of the plate for securing the plate to the motor mounting frame. Adjacent one end of the plate is a receiver for receiving and positively holding the lead wire at a position spaced from the brush. Additionally, there is provided in the plate member a system for accommodating sliding movement of the wire during sliding of the brush with which it is in electrical contact.

While this invention is susceptible of embodiment in many different forms, there are shown in the drawings and will herein be described in detail two forms of the invention with the understanding that the present disclosure is to be considered as an exemplification of the principles of the invention and is not intended to limit the invention to the forms illustrated.

BRIEF DESCRIPTION OF THE DRAWINGS

FIG. 5 is an end view of the other clip member and mounting;

FIG. 6 is a perspective view of the clip member of FIGS. 3 and 4; and

FIG. 7 is a perspective view of the clip member of FIG. 5.

DESCRIPTION OF THE PREFERRED EMBODIMENTS

Figure 1:
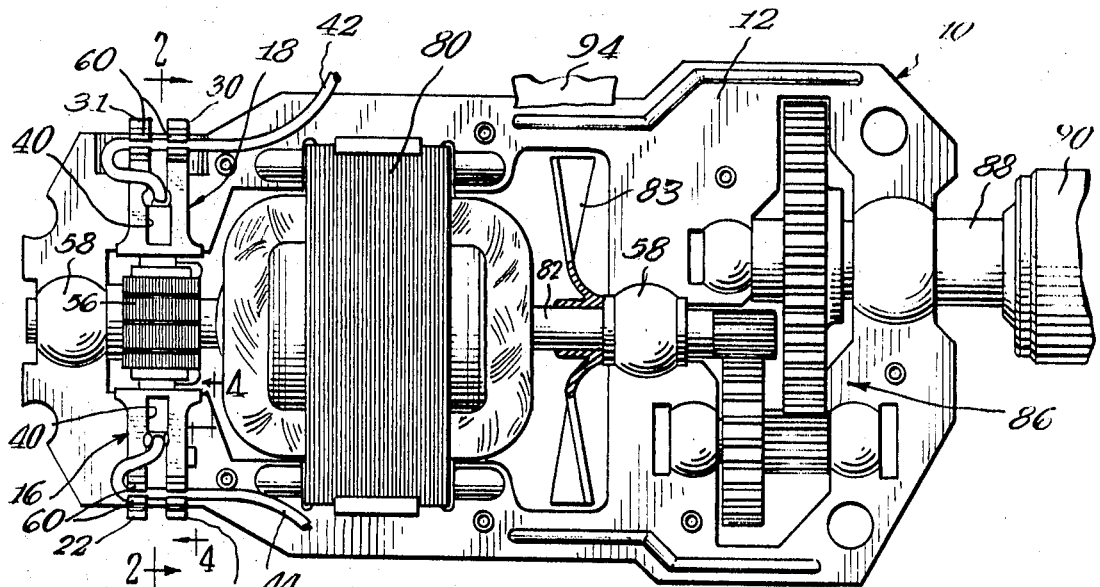
FIG. 1 is a plan view of an electric motor mounted on a motor mounting plate module and embodying two forms of lead wire clip members of this invention.

Referring first to FIGS. 1–5 of the drawings, there is shown a motor mounting frame 10 which includes two plates 12 and 14 stamped in 10 single operation from a blank conductive sheet metal as described in the above-mentioned application Ser. No. 850,834, the disclosure of which is incorporated herein by reference. Plates 12 and 14 are secured together face-to-face by suitable bolts, rivets, welds or like means. The plates 12 and 14 include stamped raised channel portions at 12a, 14a, and 14b for accommodating a wire mounting system including a pair of resilient electrically insulating plastic, preferably molded thermoplastic, wire mounting clip members 16 and 18. The channel portions 14a and 14b are for receiving a brush-holding system while the raised channel portion 12a is received by a clip member for a brush wire holder which will be described in detail hereinbelow.

Referring to FIGS. 1—7, two different forms of clip members are shown at 16 and 18 but both clip members are snap received on plate 12. Clip member 16 is an integral molded plastic member which includes leg pairs 20, 21 and 22, 23 having snap projections 24 and snap receivers 26 respectively on the inner surfaces of the legs. Projection 24 and receiver 26 receive opposing edges of a portion of frame 12. Clip member 18 is an integral molded plastic member which has leg pairs 30, 31 and 32, 33 which in turn include snap projections 34 and snap receivers 36 respectively for receiving an edge of channel portion 12a of frame 12 and an opening edge of frame 12 respectively. Each of clip members 16 and 18 has a plate member interconnecting the tops of the legs and each plate member has a long slot 40 for receiving a wire 42 or 44 slidably therein. Wires 42 and 44 are the lead wires to the brushes for the electric motor of the device.

Each of the wires 42 and 44 has a terminal loop 46 surrounding a lug 48 on a block graphite brush 50 which is slidably received in an appropriately shaped receiver 52 having two open sides. A spring 54 in each brush receiver 52 urges the terminal loop 46 against the back of its brush 50 and holds the loop 46 on lug 48 while urging the brush against the commutator 56 of the electric motor armature which is mounted for rotation by bearings 58.

The brush receiver 52 has one of its open sides facing the bottom of the plate portion of clip 16 or 18. The other open side of each receiver 52 faces the commutator 56 so that the brush can project from the receiver and be urged against and in electrical contact with the commutator 56.

Each clip 16 or 18 has a pair of snap receivers 60 for receiving the lead wire 42 or 44 at two spaced positions adjacent its terminal end 46 so that the wire cannot readily be pulled to place a force on the interconnection between loop 46 and lug 48 and also to keep the wire from being pinched when the motor mounted on frame 10 is later enclosed within two casing halves.

One difference in clips 16 and 18 is that clip 16 has a flat platform as at 62 extending between its two legs 20 and 22 as best seen in FIG. 6, while clip 18 has a stepped platform comprising an upper seat portion 64, a downwardly extending leg portion 66 and a foot portion 68 as seen in FIG. 7.

Figure 2:
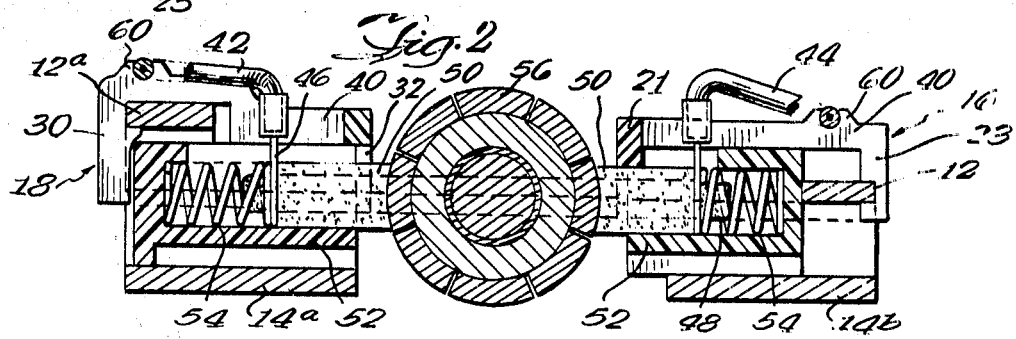
FIG. 2 is a section along line 2–2 of FIG. 1.
Figure 3:
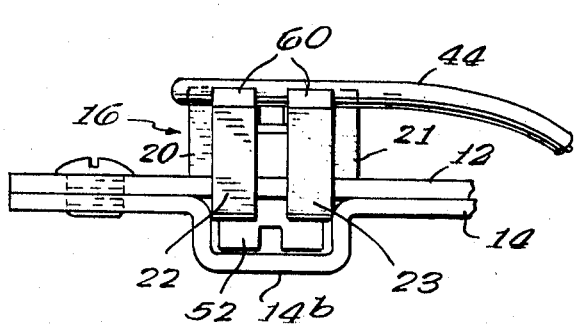
FIG. 3 is an end view of one clip member and its mounting on the motor frame.
Figure 4:
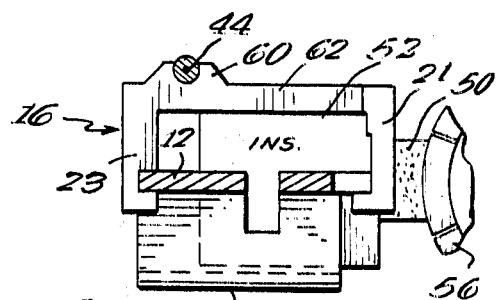
FIG. 4 is a side view of the clip member of FIG. 3.

The clip 16 is mounted for use with respect to the brush receiver or holder 52 which holder is trapped in position by its rear portion bearing against the wall of the cutout portion of frame 12, FIGS. 2 and 3. The holder 52 can be removed from the frame by first snapping the clip 16 free of the frame and then compressing the spring 54 as the holder 52 is pushed toward the commutator 56 and then pivoting the holder out of its position. A rear brush 50 can be put into the holder which is then reassembled with the frame 12.

In the case of clip 18 the legs 30 and 31 which project downwardly from the raised section 12a when the clip 18 is assembled on the frame, and which legs 30, 31 serve to back up the holder 52 on the left-hand side of FIG. 2. When the brush 50 is too worn, the clip 18 is removed from the frame 12, 14 whereby the legs 30, 31 permit the brush holder 52 and brush 50 to be removed, the brush replaced and reinstalled on the frame.

The commutator 56 is the commutator for electric motor 80 and is secured to the motor shaft 82 which is received for rotation at its ends in bearings 58 which are in turn secured to frame 10. A cooling fan 83 is usually provided on shaft 82 and shaft 82 also has a gear end 84 which is in mesh with a drive train shown generally at 86 for driving a driven shaft 88 to which there is secured a chunk 90 or the like. After the motor 80 has been mounted on frame 10, the frame is placed between casing halves and the casing is closed. The motor lead wires 42 and 44 are held by the clips 18 and 16 so that the lead wires are not pinched during closing of the casing. Casings for such tools which close along a central seam are well known in the art and a portion of such a casing is shown generally at 94 in FIG. 1.

After assembly, the tool is ready for use and the mounting clips 16 and 18 hold the brushes properly in place and also hold the lead wires from placing undue strain on the connection between the lead wires and the brushes during operation of the device.

We claim:

1. In a device driven by an electric motor mounted on a frame member in a casing, a clip member for receiving and holding a lead wire to the motor brush and for preventing pinching of the wire during assembly of the casing, said brush being mounted for slidable movement toward the motor armature commutator and urged against the commutator, said clip member comprising an insulating plate means having two opposing ends, means at each end for securing said plate to the motor mounting frame, means adjacent one end of said plate means for receiving and holding the wire at a position on the wire spaced from the brush, and means in said plate member for accommodating sliding movement of said wire during sliding of the brush, said plate means being formed of resilient plastic and said securing means at each end comprising integral leg means depending from said plate means and having inwardly turned foot means for snapping over an edge of the motor mounting frame.

2. The device of claim 1 wherein said securing means includes means above the foot means blocking the leg from sliding downwardly relative to the frame.

3. The device of claim 1 wherein said clip member comprises a one-piece insulating integral thermoplastic member.

4. The device of claim 1 including spring means for biasing the brush means against the commutator.

5. The device of claim 1 including brush mounting means for mounting the brush below the insulating plate.

6. The device of claim 5 wherein said brush mounting means comprises a separate appropriately shaped shell member having two adjacent sides open, one of said adjacent sides facing the commutator with the brush extending through said one open side, and the other open side being covered by the bottom surface of said insulating plate means.

7. The device of claim 1 wherein said means accommodating the wire for sliding movement comprises a partial longitudinal slot through said plate means.

8. The device of claim 7 wherein the brush lead wire extends from said wire holding means through said slot and into electrical contact with the brush.

9. The device of claim 8 including a solid brush member slidably received in an insulating brush receiver and including means on the rear of the brush for receiving the terminal portion of the brush lead wire and spring means urging the lead wire terminal end against the wire receiving means and the brush and urging the brush against the armature commutator.

10. In a device driven by an electric motor mounted on a frame member in a casing, a clip member for receiving and holding a lead wire to the motor brush and for preventing pinching of the wire during assembly of the casing, said brush being mounted for slidable movement toward the motor armature commutator and urged against the commutator, said clip member comprising an insulating plate means having two opposing ends, means at each end for securing said plate to the motor mounting frame, means adjacent one end of said plate means for receiving and holding the wire at a position on the wire spaced from the brush, and means in said plate member for accommodating sliding movement of said wire during sliding of the brush, said plate means comprising a pair of platforms including an upper seat platform and a lower foot platform at two different levels and interconnected by a leg portion between said platforms, said wire holding means being on the upper surface of said upper platform and including brush mounting means associated with and beneath the lower platform.

11. In a device driven by an electric motor mounted on a frame member and a casing, a clip member for receiving and holding a lead wire to the motor brush and for preventing pinching of the wire during assembly of the casing, said brush being mounted for slidable movement toward the motor armature commutator and urged against the commutator, said clip member comprising an insulating plate means including a platform and having two opposed ends, means at each end for securing said plate to the motor mounting frame, means adjacent one end of said plate means for receiving and holding the wire at a position on the wire spaced from the brush, and means in said plate member for accommodating sliding movement of said wire during sliding of the brush, said platform being flat.

12. In a device driven by an electric motor mounted on a frame member in a casing, a clip member for receiving and holding a lead wire to the motor brush and for preventing pinching of the wire during assembly of the casing, said brush being mounted for slidable movement toward the motor armature commutator and urged against the commutator, said clip member comprising an insulating plate means having two opposing ends, means at each end for securing said plate to the motor mounting frame, means adjacent one end of said plate means for receiving and holding the wire at a position on the wire spaced from the brush, and means in said plate member for accommodating sliding movement of said wire during sliding of the brush, a motor armature commutator mounted for rotational movement by said frame and one said clip member on each side of said commutator for holding both lead wires to the two motor brushes and secured to said frame of one of said clip members including a pair of platforms including an upper seat platform and a lower foot platform at two different levels and interconnected by a leg portion between said platforms, said wire holding means being on the upper surface of said upper platform and including brush mounting means associated with and beneath the lower platform; and the plate means of the other of the clip member including a flat platform.

13. The device of claim 12 wherein said securing means for each platform comprises a pair of legs depending from each end of the platform for supporting the platform, and an inwardly turned foot at the bottom of each leg for snapping over the edge of the motor frame.

14. The device of claim 10 wherein said clip member includes means for holding the brush holder in operative relation relative to the armature.